United States Patent
Manoharan et al.

(10) Patent No.: US 11,003,686 B2
(45) Date of Patent: May 11, 2021

(54) ADDRESSING DATA SKEW USING MAP-REDUCE

(71) Applicant: Roblox Corporation, San Mateo, CA (US)

(72) Inventors: Aswath Manoharan, Sunnyvale, CA (US); Nikolaus Sonntag, Foster City, CA (US); Shailendra Rathore, San Ramon, CA (US)

(73) Assignee: Roblox Corporation, San Mateo, CA (US)

( * ) Notice: Subject to any disclaimer, the term of this patent is extended or adjusted under 35 U.S.C. 154(b) by 345 days.

(21) Appl. No.: 16/046,765

(22) Filed: Jul. 26, 2018

(65) Prior Publication Data

US 2020/0034470 A1   Jan. 30, 2020

(51) Int. Cl.
*G06F 15/16*    (2006.01)
*G06F 16/27*    (2019.01)
*H04L 29/08*    (2006.01)
*G06F 16/21*    (2019.01)

(52) U.S. Cl.
CPC ........... *G06F 16/27* (2019.01); *G06F 16/217* (2019.01); *H04L 67/1095* (2013.01)

(58) Field of Classification Search
None
See application file for complete search history.

(56) References Cited

U.S. PATENT DOCUMENTS

| | | | |
|---|---|---|---|
| 9,454,444 B1 | 9/2016 | Agarwal et al. | |
| 2005/0193041 A1* | 9/2005 | Bourbonnais | G06F 16/273 |
| 2014/0101092 A1* | 4/2014 | Simitsis | G06F 9/451 |
| | | | 707/602 |
| 2016/0142868 A1 | 5/2016 | Kulkarni et al. | |
| 2017/0228285 A1 | 8/2017 | Merritt et al. | |

OTHER PUBLICATIONS

WIPO, International Search Report and Written Opinion mailed for PCT application No. PCT/US2019/043528, dated Oct 25, 2019, 10 pages.
WIPO, International Preliminary Report on Patentability for International Patent Application No. PCT/US2019/043528, dated Feb. 4, 2021, 9 pages.

* cited by examiner

*Primary Examiner* — Alex Gofman
(74) *Attorney, Agent, or Firm* — IP Spring

(57) ABSTRACT

A system and method includes using a queue with map-reduce. The system includes a computer cluster that is to execute, by a first node, a first reduce operation on a first location of data to generate a first plurality of markers indicative of data at the first location of data and execute, by a second node, a second reduce operation on a second location of data to generate a second plurality of markers indicative of data at the second location of data. Responsive to generation of one or more markers, the computer cluster is to submit the one or more markers to a queue. Responsive to completing the first reduce operation by the first node, the computer cluster is to direct the first node to perform a first copy operation that copies first data identified by a first marker of the one or more markers in the queue.

23 Claims, 4 Drawing Sheets

ADDRESSING DATA SKEW USING MAP-REDUCE

TECHNICAL FIELD

This disclosure relates to the field of map-reduce and, in particular, addressing data skew with map-reduce.

BACKGROUND

Data can be copied from a first location of data to a second location of data. The first location of data may be associated with a first server and the second location of data may be associated with a second server.

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
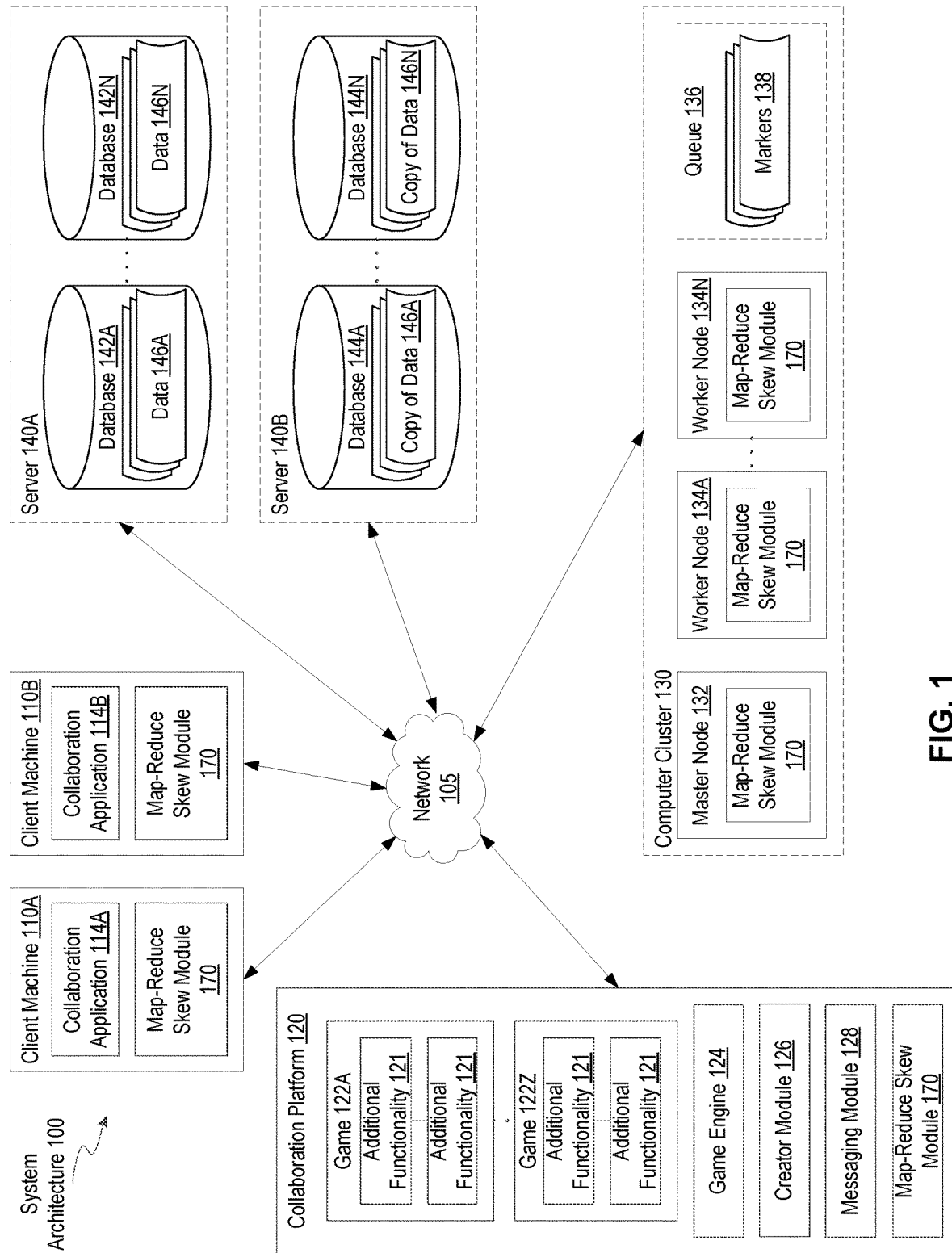
FIG. 1 illustrates an example system architecture, in accordance with some implementations.

Locations of data (e.g., databases) may be associated with a first server. For example, production databases may be associated with a production server that is used to support the operations of a platform, such as a collaboration platform. Performing analytics on the databases associated with a production server may affect the performance of the production server and the platform generally. In some cases, to perform analytics the production databases may be copied for use by a second server (e.g., an analytics server). The analytics server may perform analytics on the copied databases and not affect the performance of the production server.

In some systems, performing the processes to copy data from databases to other databases may be performed by one more computing devices, such as server computers or processing devices. For example, a single computing device may prepare to copy and copy each database serially, one after the other, which may take a prohibitively large amount of time. In another example, multiple computing devices may prepare to copy and copy data in parallel. Data of a database may be skewed. Data skew may refer to data that is distributed unevenly across databases. Data skew may cause inefficiencies in the performance of processes to copy data from databases. For example, data skew may cause some of the computing devices that perform the copy processes to go unused and remain idle. For instance, some computing devices that perform one or more of the copy processes may finish a particular process (e.g., on databases with a smaller amount of data) quickly and may sit idle and wait for other computing devices to finish the particular process (e.g., on other databases with larger amounts of data). Having idle computing devices is an inefficient use of computer resources (e.g., computer processing resources) and reduces the speed at with copy operations are performed.

Aspects of the present disclosure address the above-mentioned and other challenges by using computer nodes of a computer cluster that implement map-reduce operations to copy data of databases of a production server to the databases of another server, such as an analytics server. Identifiers of the databases to be copied are submitted to a node in the computer cluster. The node may perform a map operation on the identifiers where each of the identifiers is distributed to another computer node in the computer cluster. The other nodes may use the identifiers to perform a reduce operation on the respective databases identified by the identifiers. The other nodes performing the reduce operation generate output data, which may be markers that identify locations of data in the respective database. As the markers are generated, the markers can be stored in a queue associated with and accessible by the computer nodes of the computer cluster. Responsive to a computer node completing a reduce operation, rather than remain idle, the computer node can be repurposed to use the markers in the queue to perform a copy operation to copy data of databases of the production server to databases of another server. Other computer nodes in the computer cluster, such as computer nodes that perform reduce operations on databases with disproportionally more amounts of data, may continue to perform the reduce operation as other computer nodes that finish respective reduce operations are repurposed to perform copy operations.

Copying or other types of processing (e.g., any other operations on the data) of data using a computer cluster that implements a queue and map-reduce operations in accordance with aspects of the disclosure improves computer-related technology at least because aspects of the disclosure copy data (e.g., as data from databases of a first server to databases of another server) or process data, faster and more efficiently (e.g., more efficiently uses computer processing resources and reduces the amount of computer processing resources that idle) than other systems. The improvements in computer-related technology (e.g., speed and efficiency) are further enhanced when used to copy or process data of databases that have data skew.

It may be noted that a map operation and a reduce operation described as part of a map-reduce programming model is provided for purposes of illustration, rather than limitation. Distributing identifiers of databases to nodes of a cluster, generating markers, and copying data can take place in one or more programming models, such as hash partitioning, self-balancing tree data structure (e.g., B-tree), relational database management system (RDBMS), and so forth.

It may be noted that markers are described as being used to copy data from a first database associated with a first server to a second database associated with a second server for purposes of illustration, rather than limitation. In other implementations, the markers may be used in any number of ways, or other data processing techniques for example. In some implementations, the markers may identify location of data. In other implementations, the markers may include the data. It may further be noted that the disclosure describes copying data from databases to other databases for purposes of illustration, rather than limitation. Aspects of the present disclosure may be applied to copying data generally. For example, aspects of the present disclosure may be applied to copying data from a first location of data (e.g., one or more first data stores) to a second location of data (e.g., one or more second data stores). In may be further noted that the disclosure describes copying data for purposes of illustration, rather than limitation. Aspects of the present disclosure may be applied to any type of processing of data (e.g., any other operations on the data). For example, aspects of the present disclosure may be applied to converting of data (e.g., from a first form to a second form), validation of data, sorting of data, summarization of data, aggregation of data, analysis of data, reporting of data, etc.

FIG. 1 illustrates an example system architecture 100, in accordance with implementations of the disclosure. The system architecture 100 (also referred to as "system" herein) includes client devices 110A and 110B (generally referred to as "client device(s) 110" herein), a network 105, servers 140A and 140B (generally referred to as "servers 140"), a collaboration platform 120, and a computer cluster 130. It may be noted that system architecture 100 is provided for illustration, rather than limitation. In implementations, the system architecture 100 may include the same, fewer, more, or different elements configured in the same or different manner.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In implementations, each server 140 may be one or more computing devices (e.g., a rackmount server, a server computer, cluster of physical servers, etc.). In implementations, the servers 140 may be included in the collaboration platform 120, be an independent system, or be part of another system or platform. Servers 140 may be associated with (e.g., include) a memory (e.g., random access memory), a cache, a drive (e.g., a hard drive), a flash drive, a database system, or another type of component or device capable of storing data. Servers 140 may be associated with (e.g., include) multiple storage components (e.g., multiple drives or multiple databases) that may also span multiple computing devices (e.g., multiple server computers). The server 140A may be associated with (e.g., store) databases 142A-142N (generally referred to as "databases 142"). The server 140B may be associated with (e.g., store) databases 144A-144N (generally referred to as "databases 144"). In implementations, databases 142 may be independent from first server 140A and databases 144 may be independent from second server 140B.

In some implementations, server 140A may be a production server and server 140B may be an analytics server. Server 140A may be part of the collaboration platform 120. Databases 142 may be production databases and may include data 146 generated by one or more of server 140A, collaboration platform 120, or client device 110. Databases 144 may be analytics databases and may include copies of data 146 from databases 142. Data 146 may be copied from databases 142 to databases 144 and the copy of data 146 in databases 144 may be analyzed (e.g., to not affect performance of server 140A).

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the collaboration platform 120 and to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114 herein. In some implementations, collaboration application 114 may be two instances of the same application.

As discussed herein, collaboration platform 120 (and/or collaboration application 114) may generate (e.g., gather, process, etc.) data 146 associated with user access and interaction with collaboration platform 120, games 122, media items, game content, additional functionalities 121, game engine 124, creator module 126, messaging module 128, etc. The collaboration platform may store the data 146 in databases 142. For example, collaboration platform 120 may generate data 146 (for a database 142) including an identifier for a user, an identifier for a game 122 or media item with which the user is interacting, a start time that the user started interacting with the game 122 or media item, an end time that the user stopped interacting with the game 122 or media item, etc. In one implementation, collaboration platform 120 stores data 146 for one or more games 122 or media items in the same database 142. In another implementation, collaboration platform 120 stores data 146 for one or more users in the same database 142. In another implementation, collaboration platform 120 stores data 146 for one or more periods of time in the same database 142. For example, database 142A may include data 146A from a first day and database 142B may contain data 146B from a second day.

In implementations, collaboration platform 120 may be a type of social network providing connections between users or a type of user-generated content system that allows users (e.g., end-users or consumers) to create content for the platform, where the created content may also be consumed by other users of the system. In implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user." One or more of collaboration platform 120 or collaboration application 114 may generate (e.g., gather, process, etc.) data 146 associated with the user-generated content and may store the data 146 in database 142.

In one implementation, collaboration platform 120 may be a gaming platform, such as an online gaming platform or a virtual gaming platform. For example, the gaming platform may provide single-player or multiplayer games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games (e.g., 3D user-generated games using creator module 126), virtual reality (VR) games, or augmented reality (AR) games, for example. In implementations, users, such as playing users may participate in gameplay with other playing users. In implementations, a game 122 may be played in real-time with other users of the game 122.

In implementations, gameplay may refer to interaction of one or more players with a game (e.g., user inputs) or the presentation of the interaction on a display of a client device. In implementations, real-time or live gameplay may refer to the broadcast, presentation, or display of gameplay as the gameplay occurs, rather than past or recorded gameplay. For example, real-time gameplay may be displayed on a display of a client device 110 substantially concurrent with user interaction with a game (at least within the technical limitations of displaying real-time action, e.g., the user interaction with the game may be displayed within milliseconds of user input and may appear to the user as if in absolute real-time).

In implementations, a view of the gameplay may be presented on the client device 110. The views on different client devices 110 may be the same or different. In implementations, a view (also referred to as "field of view" herein) may refer to the extent of the observable game world that may be seen at any given moment from the perspective of a game camera and that is presented in the display of a client device. For example, the view of the game camera may be from a first-person perspective or a third-person perspective or some combination thereof.

In some implementations, a game 122 can include an electronic file that can be executed or loaded using software, firmware or hardware configured to present the game content (e.g., digital media item) to an entity. In implementations, a game 122 may be executed and rendered using a game engine 124. In some implementations, a game 122 may have a common set of rules or common goal, and the environments of a game 122 share the common set of rules or common goal. In implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game 122 may be collectively referred to a "world" or "gaming world" or "virtual world" or "universe" herein. An example of a world may be a 3D world of a game 122. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform 120 may transmit game content to collaboration applications 114. In implementations, game content (also referred to as "content" herein) may refer to any data or software instructions (e.g., game objects, game, user information, video, images, commands, media item, etc.) associated with collaboration platform 120 or collaboration applications 114. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity. One or more of collaboration platform 120 or collaboration application 114 may generate (e.g., gather, process, etc.) data 146 associated with user access to, creation of, and interaction with the content (e.g., game content, media items, etc.) and may store the data 146 in database 142.

In some implementations, a game 122 may be associated with a particular user or a particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 or client devices 110 may include a game engine 124. In implementations, game engine 124 may be used for the development or execution of games 122. For example, game engine 124 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 124 may generate commands that help compute and render the game (e.g., rendering commands, collision commands, physics commands, etc.) In some implementations, game engine 124 of client devices 110 may work independently, in collaboration with game engine 124 of collaboration platform 120, or a combination of both.

In some implementations, both the collaboration platform 120 and client device 110 execute a game engine 124. The collaboration platform 120 using game engine 124 may perform some or all the game engine functions (e.g., generate physics commands, rendering commands, etc.), or offload some or all the game engine functions to game engine 124 of client device 110. In some implementations, each game 122 may have a different ratio between the game engine functions that are performed on the collaboration platform 120 and the game engine functions that are performed on the client device 110. For example, the game engine 124 of the collaboration platform 120 may be used to generate physics commands in cases where there is a collision between at least two game objects, while the additional game engine functionality (e.g., generate rendering commands) may be offloaded to the client device 110. In some implementations, the ratio of game engine functions performed on the collaboration platform 120 and client device 110 may be changed (e.g., dynamically) based on gameplay conditions. For example, if the number of users participating in gameplay of a particular game 122 exceeds a threshold number, the collaboration platform 120 may perform one or more game engine functions that were previously performed by client device 110.

For example, playing users may be playing a game 122 on client devices 110 and may send control instructions (e.g., user inputs, such as right, left, up, down, user election, or character position and velocity information, etc.) to collaboration platform 120. Subsequent to receiving control instructions from the client devices 110, collaboration platform 120 may send gameplay instructions (e.g., position and velocity information of the characters participating in the group gameplay or commands, such as rendering commands, collision commands, etc.) to the client devices 110 based on control instructions. For instance, the collaboration platform 120 may perform one or more logical operations (e.g., using game engine 124) on the control instructions to generate gameplay instruction for the client device 110. In other instances, collaboration platform 120 may pass one or more or the control instructions from one client device 110 to other client devices participating in the game 122. The client devices 110 may use the gameplay instructions and render the gameplay for presentation on the displays of client devices 110.

In implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In implementations, the control instructions are sent directly to the collaboration platform 120. In other implementations, the control instruction may be sent from a client device 110A to another client device 110B, where the other client device 110B generates gameplay instructions using the local game engine 124.

In implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In implementations, collaboration platform 120 may include a creator module 126. In implementations, creator module 126 may allow users of the collaboration platform 120 to become creating user that design or create environments in an existing game 122, create new games, or create new game objects within games or environments.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. In some implementations, creating, modifying, or customizing characters, other game objects, games 122, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in database 142. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, collaboration platform 120 executing creator module 126 includes a user-interfacing website or application (e.g., collaboration application 114) where users (also referred to as "creating users," "creators," "owners," or "owning users" herein) may access online computational resources (e.g., cloud resources) hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114. In implementations, creator module 126 may use a user interface (also referred to as a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or build a game 122. The user may publish their game objects via the developer interface so that the game is available to users of collaboration platform 120.

In implementations, creator module 126 may provide control of created games 122 and environments to creating users who may set administrative policy regarding which users will be allowed to interact with the created game 122 or environment and which users have the capability of modifying, editing, or interacting with the game 122 or environment. Users with administrative control may also be referred to as administrative users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other group associated online venues. In implementations, creator module 126 has administrative tools for setting such policies including or in addition to general rules for interaction within the game 122 or gaming environment. One or more of collaboration platform 120 or collaboration application 114 may generate (e.g., gather, process, etc.) data 146 associated with user access to, creation of, and interaction with the games 122 and may store the data 146 in database 142.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment. It may be noted that the number of client devices 110 is provided as illustration, rather than limitation. In implementations, any number of client devices 110 may be used.

The client devices 110A-B may host various applications, including, for example, web applications, desktop applications, browser applications, etc. In one implementation, an application is a map-reduce skew module 170 (e.g., a map-reduce interface application). The map-reduce skew module 170 may allow a user of a client device 110 to send a map-reduce job to be processed and may receive a result of a map-reduce job. The map-reduce skew module 170 may allow the client device to interact with (e.g., submit map-reduce jobs to) computer cluster 130 (e.g., master node 132).

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as games 122, images, video items, web pages, documents, and so forth. In one example, the collaboration application 114 may be a web application (e.g., an application that operates in conjunction with a web browser) that can access, retrieve, present, or navigate content (e.g., virtual character in a virtual environment, etc.) served by a web server. In another example, collaboration application 114 may be a native application (e.g., a mobile application, app, or a gaming program) that is installed and executes local to client device 110 and allows users to interact with collaboration platform 120. The collaboration application 114 may render, display, or present the content (e.g., a web page, a media viewer) to a user. In an implementation, the collaboration application 114 may also include an embedded media player (e.g., a Flash® player) that is embedded in a web page.

According to aspects of the disclosure, the collaboration application 114 may be a collaboration platform application for users to build, create, edit, upload content to the collaboration platform 120 as well as interact with collaboration platform 120 (e.g., play games 122 hosted by collaboration platform 120). As such, the collaboration applications 114 may be provided to the client devices 110A and 110B by the collaboration platform 120. In another example, the collaboration applications 114 may be applications that are downloaded from the collaboration platform 120. In some implementations, collaboration application 114 of client device 110 may include game engine 124. In some implementations, game engine 124 of client device 110 may be separate from collaboration application 114.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed by the client devices 110A through 110B, computer cluster 130, or servers 140, in other implementations if appropriate. In addition, the functionality attributed to a particular component can be performed by different or multiple components operating together. The collaboration platform 120 can also be accessed as a service provided to other systems or devices through appropriate application programming interfaces (APIs), and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination thereof, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120. In another implementation, two users may use respective messaging applications to participate in in-game dialog with one another where the dialog may be part of the view that includes the gameplay. One or more of collaboration platform 120 or collaboration application 114 may generate (e.g., gather, process, etc.) data 146 associated with messaging other users via the messaging module 128 and may store the data 146 in database 142 (e.g., a chat database).

In implementations, users of a collaboration platform 120 may be linked to other users and be recognized by the collaboration platform 120 as "friends." A "friend" on the collaboration platform 120 may refer to a connection to another user via the collaboration platform 120. "Friendship" may refer the connection between at least two users via the collaboration platform 120. In some implementations, a user and their friends may have special access to one another such as the ability to see information about a friend's user account, send electronic messages to one another, trade items, as well as others. In some implementations, establishing friendships may be performed by sending a friend request to another user and having the other user accept the friend request to establish the friendship. A friend request may be a message (or alternative) sent to a user requesting that the user establish a friendship with another user on the collaboration platform 120.

In some implementations, users of collaboration platform 120 may have base functionalities to interact with other users of collaboration platform 120. By establishing a friendship with another user, a user may be allowed to access additional functionalities (also referred to as "privileges" or "additional privileges" herein) of the collaboration platform 120 that allow the friends greater opportunity to interact with one another. In some implementations, users of collaboration platform 120 that are friends may be able to use the base functionalities and the additional functionalities in response to establishing a friendship.

In some implementations, the additional functionality may include messaging functionality that allows user A (e.g., user of client device 110A) and user B (e.g., user of client device 110B) to communicate using a messaging service (e.g., messaging module 128) via the collaboration platform 120 (e.g., posts, chats, personal messages, public messages, messaging in a virtual gaming environment, video, etc.). For example, the messaging functionality may allow users to transmit messages to each other. In another example, the messaging functionality allows users to transmit certain types of information (e.g., sensitive information, contact information, name, picture, voice recording, current location, unique identifiers (device ID), etc.) to each other that would otherwise be filtered by messaging module 128. It may be noted that user A and user B are used for purposes of illustration, rather than limitation. For example, collaboration platform 120 may include one or more users capable of establishing friendships that cause collaboration platform 120 to grant additional functionality.

In some implementations, an additional functionality may include a sharing functionality that allows user A and user B to share items with each other via the collaboration platform 120. For example, users of a gaming platform may have a sharing functionality that allows users to purchase, trade, or transfer virtual items, such as virtual currency, in a virtual gaming environment.

In some implementations, an additional functionality may include a following functionality that allows user A and user B to follow each other into a game 122 or into a specific gaming environment of a game 122 hosted by the collaboration platform 120. For example, user A may be participating in a game 122A. The following functionality may allow user B to navigate to a profile page of user A and select an option, "Join Game," on user A's profile page, which places user B in the game 122A (e.g., the specific gaming environment of game 122A where user A is participating). In implementations, the following functionality may also include a notification feature that for example, notifies user B of the game in which user A has moved or is currently participating.

In some implementations, an additional functionality may include an invitation functionality that allows user A and user B to invite each other to a private game hosted by the collaboration platform 120. For example, user A may create a private game and the invitation functionality may allow user A to invite user B to participate in the private game.

In some implementations, an additional functionality may include a group functionality that allows user A and user B to join a group hosted by the collaboration platform 120. For example, the additional functionality may allow user A to invite user B to a group where user A is a group member or group creator. Members of a group may participate with each other to compete against a different group in a game 122, may participate with each other in building (e.g., environments, structures, etc.) within a game 122, may participate with each other to create a game 122 (e.g., via creator module 126), etc.

In some implementations, an additional functionality includes an interaction functionality that allows user A and user B to interact with each other via the collaboration platform 120. For example, the base functionality may allow a user to participate in single-player games (but not multi-player games) and the interaction functionality may allow the user to participate in multi-player games. In another example, the base functionality may allow user A to compete against other users in a game 122 and the interaction functionality may allow user A to work together with user B to compete against other users in a game 122. It may be noted that the additional functionalities described herein are provided for purposes of illustration, rather than limitation. In other implementations, other features of collaboration platform 120 may be included in the additional functionalities that are provided in view of establishing a friendship.

In implementations, the computer cluster 130 includes a set of interconnected nodes 132 and 134 (e.g., computing devices) to perform a common task so that the computer cluster 130 may be viewed as a single computer system. For example, computer cluster 130 includes master node 132 and worker nodes 134A-134N. Each node 132 and 134 of computer cluster 130 may include, but is not limited to, any data processing device, such as a desktop computer, a laptop computer, a mainframe computer, a personal digital assistant, a server computer, a hand-held device or any other device configured to process data. The nodes 132 and 134 of the computer cluster 130 may be connected to each other through a network, such as network 105. Each node 132 and 134 may be running its own instance of an operating system.

Each node 132 and 134 of computer cluster 130 may have its own physical or virtual memory. Memory may include, but is not limited to, main memory such as, read-only memory (ROM), flash memory, dynamic random access memory (DRAM) (e.g., synchronous DRAM (SDRAM) or DRAM (RDRAM), etc.), and static memory (e.g., flash memory, static random access memory (SRAM), etc.). Each node of computer cluster 130 may have data stored on local storage (not shown), such as local storage disks.

Computer cluster 130, and each node 132 and 134 of computer cluster 130, can further implement various network-accessible server-based functionalities (not shown) or include other data processing equipment.

The computer cluster 130 may be associated with (e.g., include) a queue 136. A queue 136 can include a data structure that stores elements (e.g., markers 138 that identify units of data 146, markers that are units of data 146). The elements in the queue 136 may be kept in an order and operations on the data structure may include the addition of elements to the data structure and removal of elements from the data structure. For example, the queue 136 may be a First-In-First-Out (FIFO) queue where the first element added to the queue will be the first element to be removed from the queue (e.g., operations on the data structure include addition of elements to the rear terminal position of the queue and removal of elements from the front terminal position of the queue). In some implementations, the queue 136 is hosted by the computer cluster 130. In some implementations, the queue hosted external to the computer cluster 130. The queue 136 may be stored on one or more of master node 132, a worker node 134, a server 140, etc. In one implementation, the queue 136 may be stored in a memory (e.g., random access memory), a cache, a drive (e.g., a hard drive), a flash drive, a database system, or another type of component or device capable of storing data. The queue 136 may be stored on any number of mass storage devices, such as magnetic or optical storage based disks, solid-state drives (SSDs) or hard drives, coupled to nodes 132 and 134. The queue 136 may be stored on multiple storage components (e.g., multiple drives or multiple databases) that may also span multiple computing devices (e.g., multiple server computers). In implementations, the queue 136 may be stored on a distributed file system. For example, the queue 136 may be stored on a cloud storage service. The queue 136 may include markers 138. Each marker 138 may be associated with a portion (e.g., a set of rows) of data 146 in database 142. Each marker may identify a database 142, a beginning address of data (e.g., a beginning row in the database 142), and an ending address of data (e.g., an ending row in the database 142). For example, a marker 138 may be associated with rows one through 10,000 in database 142A. Each marker 138 may identify a fixed size address range. For example, a first marker 138 may identify rows 1-10,000 of database 142A and a second marker 138 may identify rows 10,001-20,000 of database 142A.

In implementations, computer cluster 130 may copy data 146 associated with server 140A to server 140B (e.g., from databases 142 to databases 144). In implementations, the server 140A receives data 146 from collaboration platform 120 and stores the data 146 in databases 142. Related data 146 may be stored in the same database 142.

Computer cluster 130 may include a master node 132 and worker nodes 134. Master node 132 may control the processing of the map-reduce job. The master node 132 may determine how many map operations to use, how many reduce operations to use, which processes and processing devices (e.g., nodes) to use to perform the operations, where to store the intermediate data and the output data (e.g., markers 138), how to respond to processing failures, etc.

Master node 132 may contain map-reduce skew module 170. Map-reduce skew module 170 operating on the master node 132 may receive one or more map-reduce jobs from the client devices 110A-B (e.g., a client device 110 may submit a map-reduce job that is received by master node 132). As described in more detail below, map-reduce skew module 170 executing on master node 132 may cause worker node 134A to execute a map operation on identifiers of the databases 142 to distribute databases to worker nodes 134B-C, cause worker node 134B to execute a first reduce operation on database 142A to generate markers 138, cause worker node 134C to execute a second reduce operation on database 142B to generate markers 138, submit markers 138 to queue 136, and direct a worker node 134 to perform a copy operation based on a marker 138 in the queue 136 responsive to the worker node 134 completing the respective reduce operation.

In implementations, once the map-reduce job is sent to cluster 130, the map-reduce skew module 170 executing on the master node 132 may monitor the progress of the map-reduce job being executed on the cluster 130. In implementations, map-reduce skew module 170 executing on the master node 132 may receive a result of the map-reduce job (e.g., markers 138) and may store the result in the queue 136.

In implementations, each node 132 and 134 of computer cluster 130 may execute all or part of a map-reduce job. The execution of all or part of one or more map-reduce jobs is illustrated by map-reduce skew module 170 running on their respective nodes. It may be noted that a single map-reduce job may run on one or more nodes of cluster 130 in parallel. Each node 132 and 134 may have memory (e.g., memory hardware) and may also communicate with the queue 136 or local storage (not shown).

In implementations, the computer cluster 130 may run a map-reduce framework. Each node 132 and 134 of cluster 130 is configured to run a specific map-reduce framework. Different frameworks include frameworks such as, Apache™ Hadoop®, Hazelcast®, MongoDB®, Infinispan, and Apache™ Spark™.

In implementations, map-reduce skew module 170 receives map-reduce jobs submitted by client devices 110A. Map-reduce skew module 170 may also receive information from computer cluster 130 and servers 140 (e.g., databases 142, databases 144). The information may include input data (e.g., identifiers of databases 142), intermediate data (e.g., identifiers of databases 142), and output data (e.g., markers 138) of the map-reduce job.

It may be noted that a map-reduce job may include multiple functions. It may be noted that a map-reduce job may describe a complete execution of the functions and may include an input data, intermediate data, and output data. Alternatively, a map-reduce job may indicate one or more functions or operations in executing a map-reduce job. For example, a map-reduce job may refer to the map function or the reduce function.

For the sake of illustration, rather than limitation, map-reduce skew module 170 is described as implemented on master node 132. In other implementations, map-reduce skew module 170 may in part or wholly be implemented on collaboration platform 120. In other implementations, map-reduce skew module 170 may in part or wholly be implemented on client devices 110. In other implementations, map-reduce skew module 170 operating on one or more of client device 110, computer cluster 130, or collaboration platform 120 may work in conjunction to perform the operations described herein. Although implementations of the disclosure are discussed in terms of collaboration platforms, implementations may also be generally applied to any type of platform generating data 146. The map-reduce skew module 170 may help facilitate the operations described herein, such as operations described with respect to FIGS. 2-3. In some implementations, the map-reduce skew module 170 may be part of another application (e.g., collaboration application 114), such as a plug-in. In some implementations, map-reduce skew module 170 may be a separate application executing on a device.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
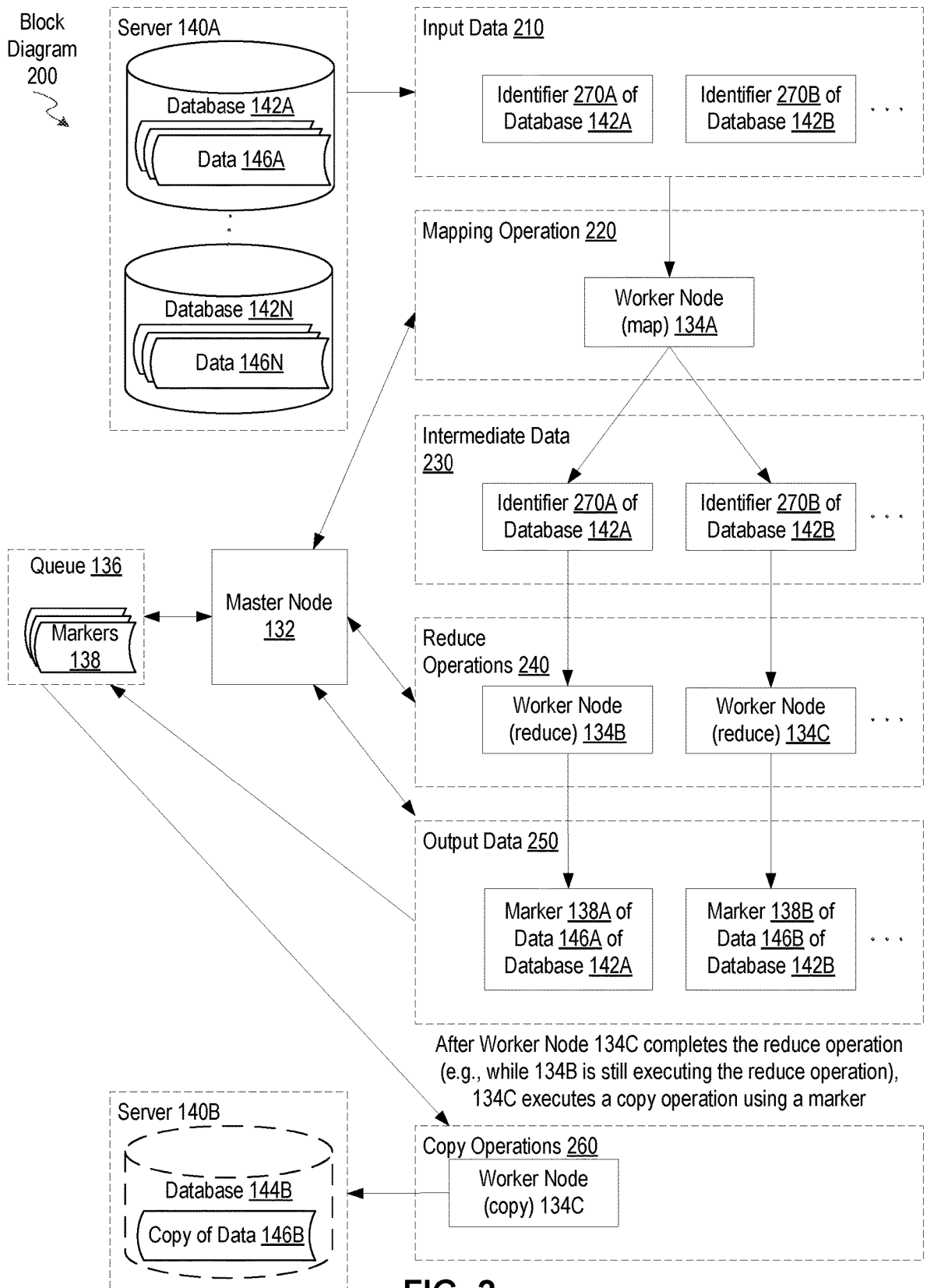
FIG. 2 is a block diagram illustrating copying data using a queue, in accordance with some implementations.

FIG. 2 is a block diagram illustrating copying data 146 using a queue 136, in accordance with some implementations. As shown in FIG. 2, a set of input data 210 (e.g., identifiers 270 of databases 142) is processed by a first set of processes (e.g., mapping operations 220) to distribute a set of intermediate data 230 (e.g., identifiers 270 of databases 142). The intermediate data 230 is processed by a second set of processes (e.g., reduce operations 240) to generate output data 250 (e.g., markers 138 of data 146 of databases 142). The output data 250 may be placed in a queue 136 and then processed by a third set of processes (e.g., copy operations 260) to generate a copy of data 146. The master node 132 controls the set of processing tasks, determines how many map tasks to use, how many reduce tasks to use, which processes and processors (e.g., nodes) to use to perform the tasks, where to store the input data 210, intermediate data 230, output data 250, and copy of data 146, how to respond to any processing failures, etc. Master node 132 assigns tasks to processes and multiple processes may be executed by each of the nodes 134 (e.g., worker node 134A may execute a map operation 220 and a reduce operation). The processes controlled by the master node 132 may be a subset of the full set of processes executed by the system 100 and the set of nodes 134 available to do the work assigned by the master node 132 may be fewer than the set of nodes 134 of the system 100.

In some implementations, the mapping operation 220 is a pass-through operation and the intermediate data 230 is the same as the input data 210. The worker node 134A (via the mapping operation 220) may distribute the intermediate data 230 to the worker nodes 134 for the reduce operations 240. The worker node 134A in mapping operation 220 may distribute a respective identifier 270 of a database 142 to each worker node 134B-C in the reduce operations 240 so that each worker node 134B-C executes a respective reduce operation on a respective database 142. The worker nodes 134B-C may execute reduce operations 240 to output markers 138 of data 146 of the respective database 142. Each marker 138 may correspond to database 142, a beginning address of data 146, and an ending address of data 146. Each marker 138 may identify a fixed size address range (e.g., 10,000 rows of data).

As each marker 138 is generated by a worker node 134 and may be submitted to a queue 136 associated with the computer cluster 130. Markers 138 may be submitted (e.g., continuously) as the markers 138 are generated (e.g., not waiting for the reduce operation 240 to complete). In some implementations, a worker node 134 outputs (e.g., submits) the marker 138 to the queue 136. In some implementations, the master node 132 determines that a marker 138 has been generated by the worker node 134 and the master node 132 submits the marker 138 to the queue 136. Responsive to submitting a marker 138 to the queue 136, the master node 132 may generate a first message indicating that the marker 138 is in the queue 136 and broadcast the first message to the worker nodes 134B-C.

In one implementation, database 142A is larger (e.g., has more rows of data 146) than database 142B. Worker node 134C may complete a respective reduce operation 240B that generated markers 138 for database 142B while worker node 134B is still performing a respective reduce operation 240A on database 142A. The master node 132 may receive a second message from the worker node 134C indicating that the worker node 134C has completed the respective reduce operation on the database 142B.

The master node 132 may direct the worker node 134C to perform a copy operation 260 that copies data 146 identified by a marker 138 (in queue 136) to database 144. In some implementations, the master node 132 directs the worker node 134C to perform a copy operation 260 that copies data 146B identified by a marker 138B, where the worker node 134C generated the marker 138B. In some implementations, the master node 132 directs the worker node 134C to perform a copy operation 260 that copies data 146A identified by a marker 138A, where the worker node 134B generated the marker 138A. To perform the copy operation 260, the worker node 134C may copy the data 146 identified by a marker 138 from a database 142 associated with server 140A to another database 144 associated with server 140B.

Subsequent to directing the worker node 134C to perform the copy operation 260, the master node 132 may receive a third message from the worker node 134C that the worker node 134C has completed copying the data 146 identified by the marker 138 (e.g., from database 142 associated with server 140A to database 144 associated with server 140B). In some implementations, responsive to receiving the third message from the worker node 134C, the master node 132 may remove the marker 138 from the queue 136. In some implementations, responsive to directing the worker node 134C to perform the copy operation, the master node 132 may remove the marker 138 from the queue 136. In some implementations, the master node 132 may monitor the copy operation 260 and responsive to determining the copy operation 260 corresponding to the marker 138 has completed, the master node 132 may remove the marker 138 from the queue 136.

Responsive to determining that worker node 134B has completed a respective reduce operation 240 on database 142A, the master node 132 may direct the worker node 134B to perform a copy operation 260 that copies data 146 identified by another marker 138 in the queue 136. The worker nodes 134A-N may start copy operations at different points in time (e.g., once they are available) so that the worker nodes 134A-N are not idle. The master node 132 may distribute the markers 138 to the different worker nodes 134A-N for execution of copy operations as each of the worker nodes 134 becomes available (e.g., completes a respective reduce operation 240, completes a respective mapping operation 220).

After all reduce operations 240 are completed by the worker nodes 134, a final record may be sent (e.g., by the master node 132) to the queue 136 indicating reduce operation 240 completion. After all copy operations 260 are completed, a final record may be sent (e.g., by the master node 132) to the queue 136 indicating completion of copying data from the databases 142.

Figure 3:
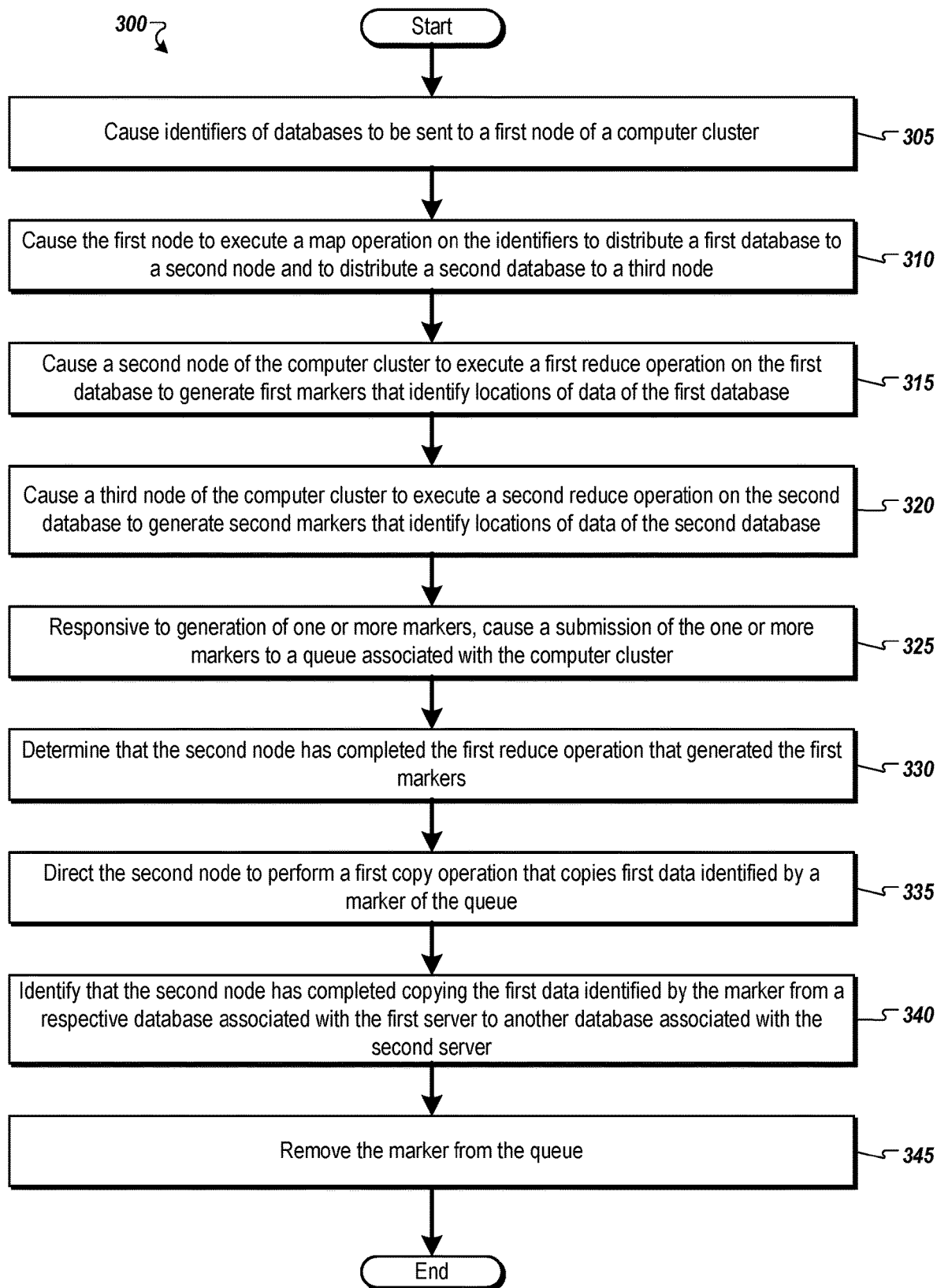
FIG. 3 is a flow diagram illustrating a method for copying data using a queue, in accordance with some implementations.

FIG. 3 is a flow diagram illustrating a method 300 for copying data using a queue, in accordance with implementations of the disclosure. Method 300 may be performed by processing logic that includes hardware (e.g., circuitry, dedicated logic, programmable logic, microcode), software (e.g., instructions run on a processing device to perform hardware simulation), or a combination thereof. In some implementations, map-reduce skew module 170 executing at master node 132 may perform some or all the operations. In other implementations, map-reduce skew module 170 executing at collaboration platform 120, client device 110A, client device 110B, master node 132, worker node 134, or combination thereof may perform some or all the operations. Elements of FIGS. 1-2 may be used to help illustrated method 300. It may be noted that the in some implementations, method 300 may include the same, different, fewer, or a greater number of operations performed in any order.

At block 305 of method 300, processing logic performing method 300 causes identifiers 270 of databases 142 to be sent to a first node 134A of a computer cluster 130. The processing logic may receive the identifiers 270 of databases 142 that are used by a first server 140A to cause a copy of the databases 142 for use by a second server 140B. In some implementations, processing logic receives a map-reduce job from a client device 110 or collaboration platform 120. The map-reduce job may indicate databases 142 to be copied. In some implementations, the processing logic generates identifiers 270 of databases 142 (e.g., one identifier 270 per database 142). In some implementations, the processing logic receives the identifiers 270 of databases 142 (e.g., as part of the map-reduce job, in conjunction with the map-reduce job).

At block 310, processing logic causes the first node 134A to execute a map operation 220 on the identifiers 270 to distribute a first database 142A to a second node 134B and to distribute a second database 142B to a third node 134C. The map operation 220 may distribute the identifiers 270 to nodes 134. The map operation 220 may distribute one identifier 270 per node 134.

At block 315, processing logic causes a second node 134B of the computer cluster 130 to execute a first reduce operation 240A on the first database 142A to generate first markers 138. In some implementations, the markers 138 identify locations of data 146 of a respective database (e.g., data 146A of the first database 142A). In some implementations, the markers 138 include the data 146 (e.g., units of data) of the respective database 142. In some implementations, the identifier 270 includes information about the database 142 (e.g., indicates the amount of rows of data 146 in the database 142). In some implementations, the worker node 134 uses the identifier 270 to identify the database 142 associated with the first server 140A and obtains information about the database 142 from the database 142 or from the first server 140A.

At block 320, processing logic causes a third node 134C of the computer cluster 130 to execute a second reduce operation 240B on the second database 142B to generate second markers 138 (e.g., that identify locations of data 146 of the second database 142B, that are the units of data of the second database 142B). In some implementations, the second database 142B is smaller (e.g., has less rows) than the first database 142A and the third node 134C completes the second reduce operation 240B before the second node 134B completes the first reduce operation 240A.

At block 325, processing logic, responsive to generation of one or more markers 138, causes a submission of the one or more markers 138 to a queue 136 associated with the computer cluster 130. In some implementations, the processing logic monitors the nodes 134 placing the markers 138 in the queue 136. Each marker 138 is submitted to the queue 136 as the respective marker 138 is generated (e.g., marker 138 is immediately sent to the queue once the marker 138 is generated even if the reduce operation 240 executing on the worker node 134 has not completed). The queue 136 receives markers 138 as the markers 138 are generated (e.g., without waiting for reduce operations 240 executing on worker nodes 134 to finish). It can be noted that the queue 136 can part of the computer cluster 130 on which the reduce operation 240 is performed, or on other hardware.

At block 330, processing logic determines that the second node 134B has completed the first reduce operation 220A that generated the first markers 138. In some implementations, processing logic monitors the reduce operations 240 to determine that a node 134 has completed a reduce operation 220. In some implementations, a node 134 transmits a final record to the queue 136 responsive to finishing the respective reduce operation 240.

At block 335, processing logic directs the second node 134B to perform a first copy operation 260A that copies first data 146 corresponding to a marker 138 of the queue 136. In some implementations, the second node 134B generated the marker 138 in the reduce operation 240A. In some implementations, the third node 134C generated the marker 138 in the reduce operation 240B.

At block 340, processing logic identifies that the second node 134B has completed copying the first data 146 corresponding to the marker 138 from a respective database 142 associated with the first server 140A to another database 144 associated with the second server 140B. In some implementations, the processing logic monitors the copy operations 260 to determine a node 134 has completed copying data 146 corresponding to a marker 138. In some implementations, the node 134 transmits a message to the processing logic responsive to completing copying data 146 corresponding to a marker 138. In implementations, after the second node 134B completes copying the first data 146 corresponding to the marker 138, the second node 134B can return to the queue 136 to retrieve the next marker in the queue and perform another copy operation. The second node 134B can continue copying data until no markers remain in queue 136.

At block 345, processing logic removes the marker 138 from the queue 136. In some implementations, the processing logic removes the marker 138 from the queue 136 responsive to determining a node 134 completed copying the data 146 corresponding to the marker 138 from a database 142 to a database 144. In some implementations, the processing logic removes the marker 138 from the queue 136 responsive receiving an indication from a node 134 that the node 134 has completed copying the data 146 corresponding to the marker 138 from the database 142 to the database 144.

In implementations, as other nodes 134 of computer cluster 130 complete respective reduce operations, the other nodes 134 can be repurposed to perform copy operations using the queue 136 (similar as described above). The processing logic continues directing nodes 134 to perform copy operations to copy data 146 corresponding to markers 138 of the queue 136 (in the order that the queue provides) until all of the data 146 from the databases 142 has been copied to the databases 144. In some implementations, copying of data 146 from databases 142 to databases 144 may be performed in parallel. For instance, copying of database 142A and 142B can be copied in parallel.

Method 300 describes copying data 146 from databases 142 to other databases 144 for purposes of illustration, rather than limitation. In other implementations, aspects of the present disclosure can be applied to efficiently copying stored data generally, such as structured data (e.g., databases) or unstructured data. For example, data can be copied from one or more data stores of a first group of data stores to one or more data stores of a second group of data stores. A data store can be a repository to persistently store collections of data, and can include databases or other types of data such as files, emails, picture, etc. An illustration is provided below.

In some implementations, at block 305 of method 300, processing logic performing method 300 causes identifiers 270 of a first group of data stores to be sent to a first node 134A of a computer cluster 130. At block 305 processing logic can cause the first node 134A to execute a map operation 220 on the identifiers 270 to distribute a first data store of a first group of data stores to a second node 134B and to distribute a second data store of the first group of data stores to a third node 134C. At block 315, processing logic causes a second node 134B of the computer cluster 130 to execute a first reduce operation 240A on the first data store to generate first markers 138. In some implementations, the markers 138 identify locations of data 146 at the data store. In some implementations, the markers 138 include the data 146 (e.g., units of data) of the data store. At block 320, processing logic causes a third node 134C of the computer cluster 130 to execute a second reduce operation 240B on the second data store of the first group of data stores to generate second markers 138. At block 325, processing logic, responsive to generation of one or more markers 138, causes a submission of the one or more markers 138 to a queue 136 associated with the computer cluster 130. At block 330, processing logic determines that the second node 134B has completed the first reduce operation 220A that generated the first markers 138. At block 335, processing logic directs the second node 134B to perform a first copy operation 260A that copies first data 146 corresponding to a marker 138 of the queue 136. At block 340, processing logic identifies that the second node 134B has completed copying the first data 146 corresponding to the marker 138 from a respective data store of the first group of data stores to another data store of a second group of data stores. At block 345, processing logic removes the marker 138 from the queue 136.

Figure 4:
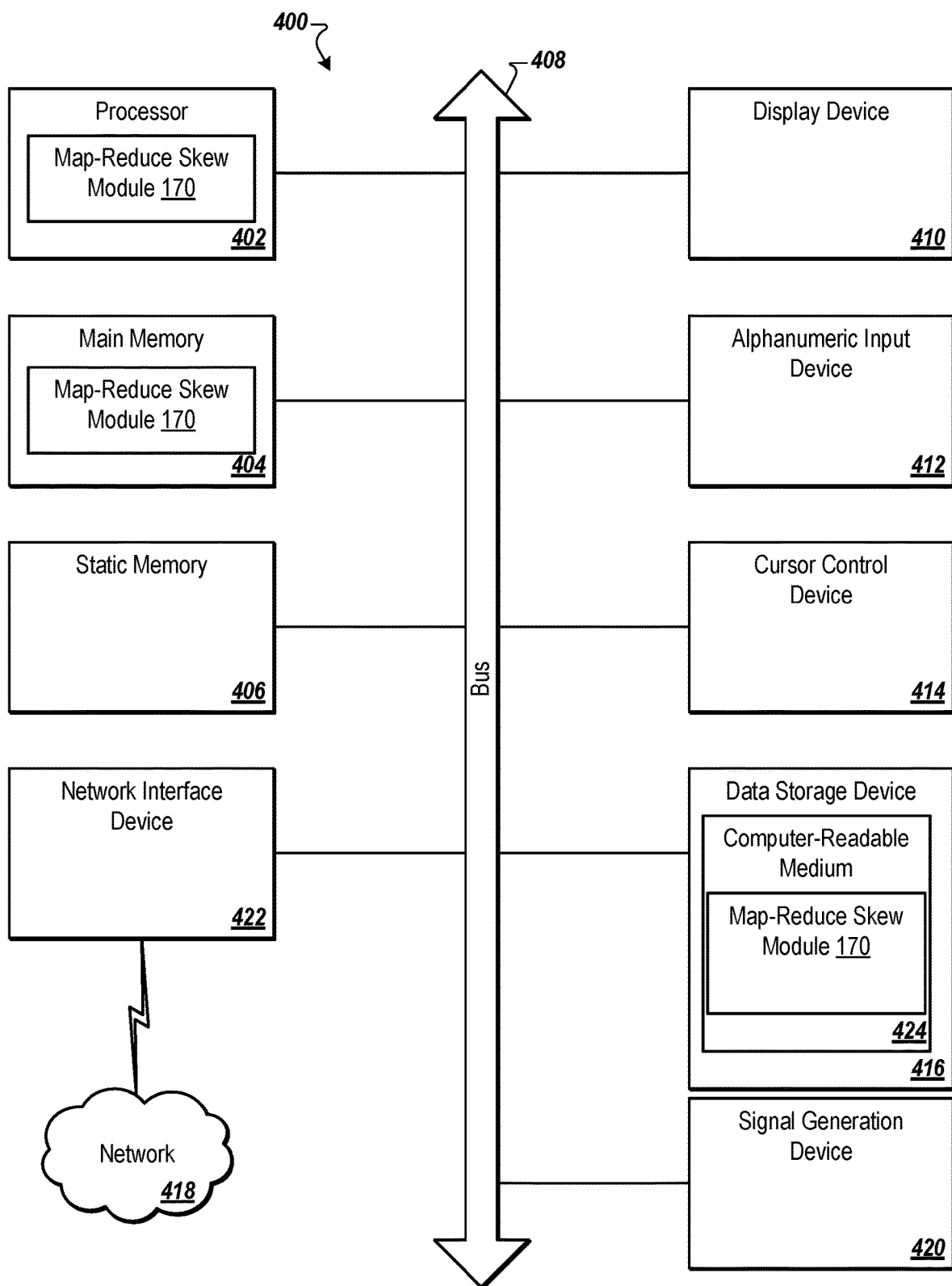
FIG. 4 is a block diagram illustrating an exemplary computer system, according to some implementations.

FIG. 4 is a block diagram illustrating an exemplary computer system 400, in accordance with implementations. The computer system 400 executes one or more sets of instructions that cause the machine to perform any one or more of the methodologies discussed herein. Set of instructions, instructions, and the like may refer to instructions that, when executed computer system 400, cause computer system 400 to perform one or more operations of map-reduce skew module 170. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of the system architecture 100 and the map-reduce skew module 170 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 on which is stored the sets of instructions of the system architecture 100 and map-reduce skew module 170 embodying any one or more of the methodologies or operations described herein. The sets of instructions of the system architecture 100 and map-reduce skew module 170 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operation s leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "executing," "submitting," "receiving," "identifying," "copying," "directing," "removing," "determining," "performing," "causing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

We claim:

1. A system comprising:
  a hardware computer cluster comprising a plurality of nodes, the hardware computer cluster arranged to perform operations that comprise:
  execute, by a first node of the plurality of nodes, a first reduce operation on a first location of data to generate a first plurality of markers indicative of data at the first location of data;
  execute, by a second node of the plurality of nodes, a second reduce operation on a second location of data to generate a second plurality of markers indicative of data at the second location of data;
  responsive to generation of one or more markers of the first plurality of markers or the second plurality of markers, submit the one or more markers to a queue associated with the computer cluster;
  responsive to completing the first reduce operation by the first node that generated the first plurality of markers, direct the first node to perform a first copy operation that copies first data identified by a first marker of the one or more markers in the queue, wherein the first copy operation by the first node is performed concurrently with the second reduce operation performed by the second node; and responsive to a determination that the first node has completed the first copy operation, remove the first marker from the queue.

2. The system of claim 1, wherein the hardware computer cluster is arranged to perform further operations that comprise receive identifiers of a plurality of locations of data; and execute, by a third node of the plurality of nodes, a map operation on the identifiers of the plurality of locations of data to distribute the first location of data to the first node for execution of the first reduce operation and to distribute the second location of data to the second node for execution of the second reduce operation.

3. The system of claim 1, wherein, to perform the first copy operation, the first node is to copy the first data identified by the first marker from a respective location of data associated with a first server to another location of data associated with a second server.

4. The system of claim 1, wherein the hardware computer cluster is arranged to perform further operations that comprise:

subsequent to directing the first node to perform the first copy operation, determine, by a master node of the computer cluster, that the first node has completed copying the first data identified by the first marker from a respective location of data associated with a first server to another location of data associated with a second server, wherein the operation of removing the first marker from the queue is performed by the master node.

5. The system of claim 1, wherein the hardware computer cluster is arranged to perform further operations that comprise:

responsive to determining that the second node of the computer cluster has completed the second reduce operation on the second location of data, direct the second node to perform a second copy operation that copies second data identified by a second marker of the one or more markers in the queue.

6. The system of claim 1, wherein each marker of the first plurality of markers and the second plurality of markers identifies a corresponding location of data, a beginning address of data, and an ending address of the data.

7. The system of claim 6, wherein each marker of the first plurality of markers and the second plurality of markers identifies a fixed size address range.

8. The system of claim 1, wherein each marker contains the corresponding data.

9. A method comprising:

causing, by a processing device, a first node of a plurality of nodes of a computer cluster to execute a first reduce operation on a first location of data to generate a first plurality of markers indicative of data at the first location of data;

causing a second node of the plurality of nodes to execute a second reduce operation on a second location of data to generate a second plurality of markers indicative of data at the second location of data;

responsive to generation of one or more markers of the first plurality of markers or the second plurality of markers, causing a submission of the one or more markers to a queue associated with the computer cluster;

responsive to a determination that the first node has completed the first reduce operation that generated the first plurality of markers, directing the first node to perform a first copy operation that copies first data identified by a first marker of the one or more markers in the queue, wherein the first copy operation by the first node is performed concurrently with the second reduce operation performed by the second node; and responsive to a determination that the first node has completed the first copy operation, removing the first marker from the queue.

10. The method of claim 9, further comprising:

causing identifiers of a plurality of locations of data to be sent to a third node; and causing the third node of the plurality of nodes to execute a map operation on the identifiers of the plurality of locations of data to distribute the first location of data to the first node for execution of the first reduce operation and to distribute the second location of data to the second node for execution of the second reduce operation.

11. The method of claim 9, wherein to perform the first copy operation, the first node is to copy the first data identified by the first marker from a respective location of data associated with a first server to another location of data associated with a second server.

12. The method of claim 9, further comprising:

subsequent to the directing of the first node to perform the first copy operation, determining, by a master node of the computer cluster, that the first node has completed copying the first data identified by the first marker from a respective location of data associated with a first server to another location of data associated with a second server, wherein the operation of removing the first marker from the queue is performed by the master node.

13. The method of claim 9, further comprising:

responsive to determining that the second node of the computer cluster has completed the second reduce operation on the second location of data, directing the second node to perform a second copy operation that copies second data identified by a second marker of the one or more markers in the queue.

14. The method of claim 9, wherein each marker of the first plurality of markers and the second plurality of markers identifies a corresponding location of data, a beginning address of data, and an ending address of the data.

15. A system comprising:

a master node of a plurality of nodes of a computer cluster, the master node configured to:

cause a first worker node of the plurality of nodes to execute a first reduce operation on a first location of data to generate a first plurality of markers indicative of data at the first location of data;

cause a second worker node of the plurality of nodes to execute a second reduce operation on a second location of data to generate a second plurality of markers indicative of data at the second location of data;

responsive to generation of one or more markers of the first plurality of markers or the second plurality of markers, cause a submission of the one or more markers to a queue associated with the computer cluster;

responsive to a determination that the first worker node has completed the first reduce operation that generated the first plurality of markers, direct the first worker node to perform a first copy operation that copies first data identified by a first marker of the one or more markers in the queue, wherein the first copy operation by the first worker node is performed concurrently with the second reduce operation performed by the second worker node; and responsive to a determination that the first node has completed the first copy operation, remove the first marker from the queue.

16. The system of claim 15, wherein the master node is further configured to:

cause identifiers of a plurality of locations of data to be sent to a third worker node; and cause the third worker node of the plurality of nodes to execute a map operation on the identifiers of the plurality of locations of data to distribute the first location of data to the first worker node for execution of the first reduce operation and to distribute the second location of data to the second worker node for execution of the second reduce operation.

17. The system of claim 15, wherein to perform the first copy operation, the first worker node is to copy the first data identified by the first marker from a respective location of data associated with a first server to another location of data associated with a second server.

18. The system of claim 15, wherein the master node is further configured to:

subsequent to directing the first worker node to perform the first copy operation, determine that the first worker node has completed copying the first data identified by the first marker from a respective location of data associated with a first server to another location of data associated with a second server.

19. The system of claim 15, wherein the master node is further configured to:

responsive to determining that the second worker node of the computer cluster has completed the second reduce operation on the second location of data, direct the second worker node to perform a second copy operation that copies second data identified by a second marker of the one or more markers in the queue.

20. The system of claim 15, wherein each marker of the first plurality of markers and the second plurality of markers identifies a corresponding location of data, a beginning address of data, and an ending address of the data, wherein each marker of the first plurality of markers and the second plurality of markers identifies a fixed size address range.

21. A non-transitory computer-readable storage medium comprising instructions that, responsive to execution by a processing device, cause the processing device to perform operations comprising:

executing, by a first node of a plurality of nodes of a computer cluster, a first reduce operation on a first location of data to generate a first plurality of markers indicative of data at the first location of data;

executing, by a second node of the plurality of nodes, a second reduce operation on a second location of data to generate a second plurality of markers indicative of data at the second location of data;

responsive to generation of one or more markers of the first plurality of markers or the second plurality of markers, submitting the one or more markers to a queue associated with the computer cluster;

responsive to completing the first reduce operation by the first node that generated the first plurality of markers, directing the first node to perform a first copy operation that copies first data identified by a first marker of the one or more markers in the queue, wherein the first copy operation by the first node is performed concurrently with the second reduce operation performed by the second node; and responsive to a determination that the first node has completed the first copy operation, removing, by a master node of the computer cluster, the first marker from the queue.

22. The non-transitory computer-readable storage medium of claim 21, the operations further comprising:

receiving identifiers of a plurality of locations of data; and executing, by a third node of the plurality of nodes, a map operation on the identifiers of the plurality of locations of data to distribute the first location of data to the first node for execution of the first reduce operation and to distribute the second location of data to the second node for execution of the second reduce operation.

23. The non-transitory computer-readable storage medium of claim 21, wherein, to perform the first copy operation, the first node is to copy the first data identified by the first marker from a respective location of data associated with a first server to another location of data associated with a second server.

* * * * *